United States Patent
Dang Van Nhan

(10) Patent No.: US 10,019,001 B2
(45) Date of Patent: Jul. 10, 2018

(54) METHOD FOR AUTOMATIC CONTROL OF A MOVEMENT MANEUVER OF A MOTOR VEHICLE

(71) Applicant: RENAULT s.a.s., Boulogne-Billancourt (FR)

(72) Inventor: Christophe Dang Van Nhan, Villejuif (FR)

(73) Assignee: RENAULT s.a.s., Boulogne-Billancourt (FR)

(*) Notice: Subject to any disclaimer, the term of this patent is extended or adjusted under 35 U.S.C. 154(b) by 16 days.

(21) Appl. No.: 15/115,531

(22) PCT Filed: Jan. 30, 2015

(86) PCT No.: PCT/FR2015/050217
§ 371 (c)(1),
(2) Date: Sep. 7, 2016

(87) PCT Pub. No.: WO2015/114269
PCT Pub. Date: Aug. 6, 2015

(65) Prior Publication Data
US 2017/0168479 A1 Jun. 15, 2017

(30) Foreign Application Priority Data

Jan. 31, 2014 (FR) .................................. 1400274

(51) Int. Cl.
*G05D 1/00* (2006.01)
*B62D 15/02* (2006.01)
*G01S 19/13* (2010.01)
*G05D 1/02* (2006.01)

(52) U.S. Cl.
CPC ......... *G05D 1/0016* (2013.01); *B62D 15/027* (2013.01); *B62D 15/0285* (2013.01); *G05D 1/0088* (2013.01); *G01S 19/13* (2013.01); *G05D 1/0242* (2013.01); *G05D 1/0255* (2013.01); *G05D 1/0257* (2013.01)

(58) Field of Classification Search
CPC .. G05D 1/0016; G05D 1/0088; B62D 15/027; B62D 15/085; B62D 15/0285
USPC ........................................................... 701/2
See application file for complete search history.

(56) References Cited

U.S. PATENT DOCUMENTS

| 5,379,033 A | * | 1/1995 | Fujii | ............... | G07C 9/00182 |
| | | | | | 340/12.22 |
| 2008/0033603 A1 | * | 2/2008 | Gensler | ............ | B62D 15/0285 |
| | | | | | 701/1 |
| 2009/0309970 A1 | * | 12/2009 | Ishii | .............. | B60R 1/00 |
| | | | | | 348/143 |
| 2011/0184605 A1 | * | 7/2011 | Neff | ................ | G05D 1/0231 |
| | | | | | 701/25 |
| 2015/0127208 A1 | | 5/2015 | Jecker et al. | | |
| 2015/0375741 A1 | * | 12/2015 | Kiriya | ............ | G06K 9/00355 |
| | | | | | 701/2 |
| 2016/0224025 A1 | * | 8/2016 | Petel | ............... | B62D 15/0285 |
| 2016/0264132 A1 | * | 9/2016 | Paul | ................ | B60W 30/06 |
| 2016/0282868 A1 | * | 9/2016 | Yamamura | ....... | G05D 1/0088 |

FOREIGN PATENT DOCUMENTS

| DE | 10 2009 048 492 A1 | 3/2011 |
| DE | 10 2012 007 986 A1 | 10/2013 |
| EP | 2 135 788 A1 | 12/2009 |
| JP | 2006-256382 A | 9/2006 |

OTHER PUBLICATIONS

International Search Report dated Jul. 8, 2015 for PCT/FR2015/050217 filed on Jan. 30, 2015.
French Search Report dated Dec. 1, 2014 for 1400274 filed on Jan. 31, 2014.

* cited by examiner

*Primary Examiner* — Yazan A Soofi
(74) *Attorney, Agent, or Firm* — Oblon, McClelland, Maier & Neustadt, L.L.P.

(57) ABSTRACT

A method for controlling an automatic movement maneuver of a motor vehicle between an initial position and a final position includes establishing a path between the initial position and the final position of the vehicle and recording the path in a memory. The method also includes initiating automatic movement of the vehicle from the initial position, automatically moving the vehicle along the path, and automatically stopping the vehicle in the final position. Additionally, the method includes emitting a repetitive control signal from a mobile terminal and slaving the automatic movement of the vehicle along the path to a reception of the repetitive control signal by the vehicle.

14 Claims, 1 Drawing Sheet

METHOD FOR AUTOMATIC CONTROL OF A MOVEMENT MANEUVER OF A MOTOR VEHICLE

BACKGROUND

The present invention relates to the field of the automatic movement of a motor vehicle, referred to below as a vehicle for brevity.

Such a field is known to the person skilled in the art. In this field, the vehicle is equipped with an automatic movement system which comprises a set of sensors, software and control means implemented on the vehicle in order to ensure its automatic movement; these are known per se and will not be described here.

Typically, automatic vehicle movement is carried out nowadays in the scope of an automatic parking maneuver of a motor vehicle, independently of the type of space available (parallel, angle, perpendicular, etc.).

The driver is in the vehicle, however, which may cause problems when the parking space has constraints of access to the vehicle through the doors.

BRIEF SUMMARY

The object of the present invention is to solve this problem by providing a solution which aims to control this maneuver from outside the vehicle.

More precisely, the invention relates to a method for controlling an automatic movement maneuver of a motor vehicle between an initial position and a final position, comprising steps consisting in:
 establishing a path between the initial position and the final position of the vehicle, and recording the path in a memory,
 initiating automatic movement of the vehicle from the initial position,
 automatically moving the vehicle along the path, and
 automatically stopping the vehicle in the final position.

It is essentially characterized in that it comprises steps consisting in:
 emitting a repetitive control signal from a mobile terminal, and
 slaving the automatic movement of the vehicle along the path to the reception of said repetitive control signal by the vehicle.

Steps consisting in the following may furthermore be provided:
 comparing the control signal received by the vehicle with a recorded reference signal, and
 slaving the automatic movement of the vehicle along the path furthermore to the result of the comparison.

Steps consisting in the following may be provided:
 carrying out a repetitive action on a peripheral of the mobile terminal, and
 encoding the control signal so that it represents the action carried out;
and optionally a step consisting in:
 selecting the reference signal for the comparison as a function of the encoding of the control signal.

In one embodiment, the repetitive action consists in:
 carrying out a repetitive movement on a touch screen of the mobile terminal, on at least one key or on a control knob of the mobile terminal.

In one embodiment, the repetitive action consists in:
 carrying out a repetitive movement of the mobile terminal,
the method furthermore comprising:
 recording at least one of the parameters among the acceleration, the speed and the position of the mobile terminal during the repetitive movement.

In one embodiment, the repetitive action consists in:
 carrying out a repetitive voice command which is recorded in the microphone of the mobile terminal.

Steps consisting in the following may be provided:
 slaving the speed of movement of the vehicle to a function of the speed with which the repetitive action is carried out on a peripheral of the mobile terminal, or
 moving the vehicle independently of the speed with which the repetitive action is carried out on peripheral of the mobile terminal.

A step consisting in the following may furthermore be provided:
 pairing the mobile terminal and the vehicle.

A step consisting in the following may furthermore be provided:
 preventing automatic movement of the vehicle.

A step consisting in the following may furthermore be provided:
 slaving the movement to the recognition by the vehicle of a hands-free access card.

By virtue of the invention, it is not necessary to provide a remote control having a high level of security in order to ensure that the user can stop the movement maneuver in case of emergency, for example because of an obstacle not recognized by the automatic movement system.

Advantageously, the user's smartphone may act as a remote control. It is then not necessary to design, and equip the user with, additional hardware means.

Advantageously, the repetitive command does not require the user to look at his smartphone.

In its operating principle, the present invention has a similarity to so-called "dead man's" devices commonly used in driving trains or in controlling industrial machines, but it allows remote operation by any user.

Other characteristics and advantages of the present invention will become clearer on reading the following description, which is provided by way of illustration and without limitation and is given with reference to the appended figures.

DETAILED DESCRIPTION

Figure 1:
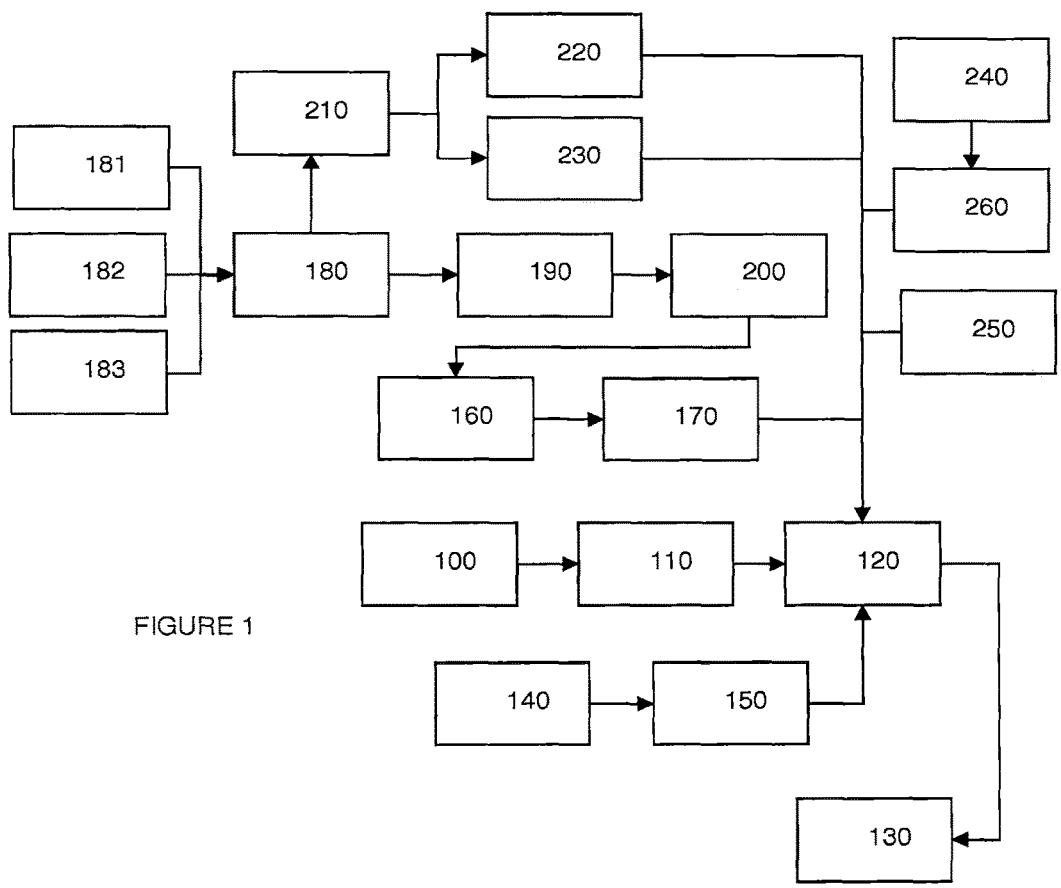
FIG. 1 illustrates an embodiment of the method according to the invention.
Figure 2:
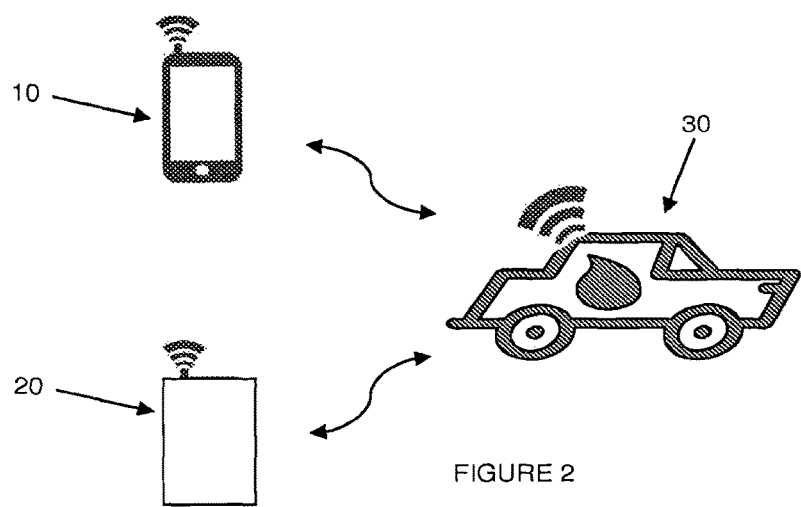
FIG. 2 illustrates an embodiment of a system making it possible to implement the device according to the invention.

In order to control an automatic movement maneuver of a motor vehicle between an initial position and a final position, a vehicle 30 equipped with an automatic movement system is provided.

The automatic movement system is activated by a portable remote control, that is to say a preferably short-range radio communication device. The portable remote control furthermore comprises at least one element among a computer, a button, a screen, optionally a touch screen, an accelerometer and microphone.

Preferably, the portable remote control is a mobile smartphone 10, which advantageously comprises all the elements mentioned above. This is why the portable remote control is referred to below as a "mobile terminal".

When the user wishes to carry out a parking maneuver, particularly in order to park his vehicle, provision is made to establish 100 a path between the initial position and the final position of the vehicle.

The path is determined in a known way by means of on-board sensors, for example ultrasonic, infrared or radar sensors, optionally coupled to GPS positioning data and a digital geographical map.

The path is recorded in a memory of the vehicle, or can be accessed thereby.

Once the path has been determined and the vehicle is in the initial position, the automatic movement is initiated 110.

Advantageously, the automatic movement is initiated by the mobile terminal, which allows the initiation to be carried out remotely from outside the vehicle.

Once the automatic movement has been initiated, provision 120 is made to move the vehicle automatically along the path by using the automatic movement system, in a known way.

When the vehicle is in the final position, the automatic movement is stopped automatically 130.

So that the automatic movement of the vehicle along the path is carried out safely, provision 140 is made to emit a repetitive control signal from mobile terminal, and 150 to slave the automatic movement of the vehicle along the path to the reception of said repetitive control signal by the vehicle.

Thus, in a similar way to so-called "dead man's" devices, lack of reception or interruption of the repetitive control signal can prevent automatic movement of the vehicle.

The level of safety of the automatic movement may be increased further by providing 160 comparison of the control signal received by the vehicle with a recorded reference signal, and 170 slaving of the automatic movement of the vehicle along the path furthermore to the result of the comparison.

Thus, if a repetitive signal is sent from a mobile terminal and received by the vehicle but this signal does not correspond to a recorded reference signal, automatic movement of the vehicle may be prevented.

The repetitive control signal is sent by the mobile terminal by a repetitive action on one of its peripherals 180.

For example, the repetitive action may consist in carrying out 181 a repetitive movement on a touch screen of the mobile terminal, for example a continuous to-and-fro movement, a circular or ellipsoidal movement, or any other predetermined movement. The position of the finger or fingers on the touch screen is identified and encoded.

The repetitive action may consist in carrying out a repetitive movement on at least one key (or button), for example a given pad key or a predetermined sequence of keys, or on a control knob of the mobile terminal. A set of at least one arbitrary key may also be provided, the repetitive movement being determined by the time elapsed between the activation of two successive keys, whatever the keys are.

The repetitive action may consist in carrying out 182 a repetitive movement of the mobile terminal, for example a movement of the mobile terminal in two or three dimensions.

The mobile terminal is generally equipped with at least one of the sensors among an accelerometer, a speed measurement sensor and a position sensor.

Provision may then be made 210 to record at least one of the parameters among the acceleration, the speed and the position of the mobile terminal during the repetitive movement.

The mobile terminal is generally also equipped with a microphone, and the repetitive action may consist in carrying out 183 a repetitive voice command which is recorded using the microphone, for example "go . . . go . . . go . . . ".

Irrespective of the nature of the repetitive action, voice or manual, carried out on a peripheral of the mobile terminal, provision is made to encode 190 the control signal in real time so that it represents the action carried out. Preferably, the mobile terminal simply transmits the raw data coming from its integrated sensors, and leaves the interpretation of the command to the vehicle.

In particular, provision may be made 200 to select the reference signal as a function of the encoding of the control signal. For example, the vehicle is equipped with a memory comprising a plurality of reference control signals. In the case in point, at least one of the reference signals among the following is provided:

at least one reference signal corresponding to a voice command, at least one reference signal corresponding to a repetitive gesture.

The encoding of the control signal makes it possible for the vehicle to determine whether the control signal is a voice signal or a gesture signal, that is to say one comprising data of acceleration, speed or position, and to select the corresponding reference signal.

If a plurality of reference signals are recorded, for example a reference signal corresponding to swiping the touch screen along a straight line and a reference signal corresponding to swiping the touch screen around a circle or an ellipse, provision is made to select the reference signal which most closely resembles the movement carried out on or by the mobile terminal.

Provision may also be made to measure or calculate the speed with which the repetitive action is carried out on a peripheral of the mobile terminal, for example the speed of movement on the touch screen or the number of actions on a key per unit time. Provision 220 may then be made to slave the speed of movement of the vehicle to a function of the speed with which the repetitive action is carried out on a peripheral of the mobile terminal. As an alternative, provision 230 may be made to move the vehicle independently of the speed with which the repetitive action is carried out on a peripheral of the mobile terminal.

Preferably, the mobile terminal and the vehicle communicate using short-range radio waves, for example according to the Bluetooth standard, which allows the maneuver to be made safe by ensuring that the user of the mobile terminal is at a short distance from the vehicle. In this case, provision may be made beforehand 240 to pair the mobile terminal and the vehicle.

In order to make the maneuver more safe, provision may be made 250 to prevent automatic movement of the vehicle before stopping in the final position.

For example, by an interruption in the transmission of the control signal; by the recognition of a sharp nonrepetitive gesture meaning "stop"; by the voice recognition of a specific term, for example "stop"; by the recognition of a static or erratic nonrepetitive control signal; or alternatively by the recognition of data which are too repetitive.

In particular, provision may be made for the repetitive control signal to be periodic, in the case in point pseudo-periodic. An action by a user on a peripheral is rarely strictly periodic, and there is most often a slight randomness which makes the value of the period vary.

Provision may then be made to calculate the standard deviation of the periodic signal and to compare the calculated standard deviation with a reference value. If the calculated standard deviation is less than the reference value, this may mean that the control signal is being generated by a machine rather than by a user. In this case, provision may be made to prevent automatic movement of the vehicle.

The vehicle may be equipped with a hands-free access card control system, which is known per se and typically makes it possible to unlock the vehicle automatically by short-range wireless communication between a hands-free radio access card 20 and the vehicle.

Typically, when a user possessing a hands-free access card operates a door handle of the vehicle, a device detects the action and wakes the vehicle, and the vehicle interrogates the access card.

Upon reception of this interrogation, the access card sends back an authentication code to the vehicle, which unlocks the doors after authentication of the code.

In this case, provision may furthermore be made 260 to slave the movement to the recognition by the vehicle of a hands-free access card 20.

Preferably, the detection perimeter of the "hands-free" card is similar to the detection perimeter of the mobile terminal.

During operation, provision may be made for the repetitive control signal by the mobile terminal or for the running of software on the mobile terminal, making it possible to record and send said repetitive control signal, to initiate a wake-up signal (for example via Bluetooth) to the vehicle.

The vehicle wakes up and interrogates any access card which may be in its vicinity.

Upon reception of this interrogation, the user's access card sends back an authentication code to the vehicle.

If the vehicle authenticates that it is in fact the access card belonging to said vehicle, the automatic movement maneuver is authorized. The vehicle may then start the engine.

By virtue of this configuration, the level of safety is even higher by ensuring that it is a priori indeed the owner of the vehicle who is initiating the automatic movement maneuver while relying on a "hands-free" device, the security of which has long been proven.

Since the communication between the vehicle and the access card on the one hand, and the mobile terminal on the other hand are short-range, this makes it possible to ensure that the user is indeed in the vicinity of the vehicle when he activates the automatic movement maneuver.

Provision may also be made for the maximum communication distance between the vehicle and the access card to be less than the maximum communication distance between the vehicle and the mobile terminal. This makes it possible, for example, for the authentication of the access card to be carried out at short range, which authorizes the initiation of the automatic movement maneuver, but for the user to then be able to move away in order to control the maneuver more conveniently.

The invention claimed is:

1. A method for controlling an automatic movement maneuver of a motor vehicle between an initial position and a final position, comprising:
    establishing a path between the initial position and the final position of the vehicle, and recording the path in a memory;
    initiating automatic movement of the vehicle from the initial position;
    automatically moving the vehicle along the path;
    automatically stopping the vehicle in the final position;
    receiving a repetitive control signal emitted from a mobile terminal generated based on a repetitive action on the mobile terminal by a user of the mobile terminal; and
    slaving the automatic movement of the vehicle along the path to the receiving of said repetitive control signal by the vehicle such that the vehicle is stopped when the repetitive action is stopped.

2. The method as claimed in claim 1, further comprising:
    comparing the control signal received by the vehicle with a recorded reference signal; and
    slaving the automatic movement of the vehicle along the path to a result of the comparing.

3. The method as claimed in claim 1, further comprising:
    encoding the control signal so that the control signal represents the action carried out.

4. The method as claimed in claim 3, further comprising:
    selecting the reference signal for the comparing as a ftmction of the encoding of the control signal.

5. The method as claimed in claim 3, wherein the repetitive action includes carrying out a repetitive movement on a touch screen of the mobile terminal, on at least one key or on a control knob of the mobile terminal.

6. The method as claimed in claim 3, wherein the repetitive action includes carrying out a repetitive movement of the mobile terminal, and
    the method further comprises:
    recording at least one parameters among an acceleration, a speed and a position of the mobile terminal during the repetitive movement.

7. The method as claimed in claim 3, wherein the repetitive action includes carrying out a repetitive voice command which is recorded in a microphone of the mobile terminal.

8. The method as claimed in claim 5, further comprising:
    slaving a speed of movement of the vehicle to a function of a speed with which the repetitive action is carried out on a peripheral of the mobile terminal, or
    moving the vehicle independently of the speed with which the repetitive action is carried out on the peripheral of the mobile terminal.

9. The method as claimed in claim 1, further comprising:
    pairing the mobile terminal and the vehicle.

10. The method as claimed in claim 1, further comprising:
    preventing the automatic movement of the vehicle.

11. The method as claimed in claim 1, further comprising:
    slaving the automatic movement to a recognition by the vehicle of a hands-free access card.

12. The method as claimed in claim 1, wherein the mobile terminal is a smartphone and the repetitive action includes carrying out a repetitive movement on a touch screen of the smartphone.

13. The method as claimed in claim 12, wherein the repetitive movement is a pattern drawn on the touch screen of the smartphone.

14. The method as claimed in claim 1, further comprising:
    calculating a standard deviation of the repetitive action;
    comparing the standard deviation with a reference value; and
    preventing the automatic movement of the vehicle when the standard deviation of the repetitive action is less than the reference value during the comparing.

* * * * *